US012694562B2

(12) United States Patent
Behling et al.

(10) Patent No.: US 12,694,562 B2
(45) Date of Patent: Jul. 28, 2026

(54) EVALUATION OF SCANNING INFORMATION USING POSITIONAL INFORMATION

(71) Applicant: Fraunhofer-Gesellschaft zur Foerderung der angewandten Forschung e.V., Munich (DE)

(72) Inventors: Jan Behling, Dortmund (DE); Mathias Rotgeri, Dortmund (DE); Jan Sören Emmerich, Dortmund (DE); Dirk Höning, Dortmund (DE); Patrick Klokowski, Dortmund (DE); Christian Hammermeister, Dortmund (DE); Michael Ten Hompel, Dortmund (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 366 days.

(21) Appl. No.: 18/324,441

(22) Filed: May 26, 2023

(65) Prior Publication Data

US 2023/0298208 A1 Sep. 21, 2023

Related U.S. Application Data

(63) Continuation of application No. PCT/EP2021/082623, filed on Nov. 23, 2021.

(30) Foreign Application Priority Data

Nov. 27, 2020 (DE) .......................... 102020214974.7

(51) Int. Cl.
*G06K 9/00* (2022.01)
*G06T 5/80* (2024.01)
(Continued)

(52) U.S. Cl.
CPC .................. *G06T 7/74* (2017.01); *G06T 5/80* (2024.01); *G06T 7/521* (2017.01); *G06T 2207/10028* (2013.01); *G06T 2207/30252* (2013.01)

(58) Field of Classification Search
CPC .. G06T 7/74; G06T 5/80; G06T 7/521; G06T 2207/10028; G06T 2207/30252;
(Continued)

(56) References Cited

U.S. PATENT DOCUMENTS 6,684,140 B2 * 1/2004 Lu ........................ B60G 17/016
701/45
10,254,767 B1 4/2019 Kamon
(Continued)

FOREIGN PATENT DOCUMENTS

CN 109211107 A 1/2019
CN 110367984 A 10/2019
(Continued)

OTHER PUBLICATIONS

Z. Feng, M. Li, M. Stolz, M. Kunert and W. Wiesbeck, "Lane Detection With a High-Resolution Automotive Radar by Introducing a New Type of Road Marking, " in IEEE Transactions on Intelligent Transportation Systems, vol. 20, No. 7, pp. 2430-2447, Jul. 2019 (Year: 2019).*
(Continued)

*Primary Examiner* — Gregory A Morse
*Assistant Examiner* — Kevin M Coomber
(74) *Attorney, Agent, or Firm* — Perkins Cole LLP; Michael A. Glenn

(57) ABSTRACT

An apparatus with a processing unit configured to obtain scanning information of a two-dimensional scan of a surface is described herein. The processing unit is further configured to obtain positional information indicating an inclination of
(Continued)

a capturing unit with respect to the surface, said capturing unit providing the two-dimensional scan and to evaluate the scanning information using the positional information with respect to a localization of the capturing unit relative to the surface.

13 Claims, 6 Drawing Sheets

(51) Int. Cl.
  *G06T 7/521* (2017.01)
  *G06T 7/73* (2017.01)

(58) Field of Classification Search
  CPC .. G01C 21/1652; G01C 21/20; G01C 21/005; G06V 10/46; G05D 1/0251; B60W 60/001; B60W 30/095; B66F 9/063
  See application file for complete search history.

(56) References Cited

U.S. PATENT DOCUMENTS

| | | | |
|---|---|---|---|
| 10,486,485 B1 * | 11/2019 | Levinson | .......... B60G 17/0162 |
| 2006/0072176 A1 | 4/2006 | Silverstein et al. | |
| 2015/0241469 A1 | 8/2015 | Osborne et al. | |
| 2018/0081056 A1 | 3/2018 | Ohtomo et al. | |
| 2018/0089907 A1 * | 3/2018 | Maruoka | ................... B60R 1/12 |
| 2019/0011257 A1 | 1/2019 | Schwendener et al. | |
| 2020/0138518 A1 | 5/2020 | Lang | |
| 2021/0101616 A1 * | 4/2021 | Hayat | ....................... G06T 7/20 |

FOREIGN PATENT DOCUMENTS

| | | | |
|---|---|---|---|
| DE | 102013001897 A1 | 8/2014 |
| WO | 2013019707 A1 | 2/2013 |
| WO | 2015199772 A2 | 12/2015 |
| WO | 2019019172 A1 | 1/2019 |

OTHER PUBLICATIONS

P. Amaradi, N. Sriramoju, Li Dang, G. S. Tewolde and J. Kwon, "Lane following and obstacle detection techniques in autonomous driving vehicles," 2016 IEEE International Conference on Electro Information Technology (EIT), Grand Forks, ND, 2016 (Year: 2016).*

K. Gao, J. Xin, H. Cheng, D. Liu and J. Li, "Multi-Mobile Robot Autonomous Navigation System for Intelligent Logistics," 2018 Chinese Automation Congress (CAC), Xi'an, China, 2018 (Year: 2018).*

Image rectification—Wikipedia—https://en.wikipedia.org/wiki/Image_rectification (2023)—6 pages.

* cited by examiner

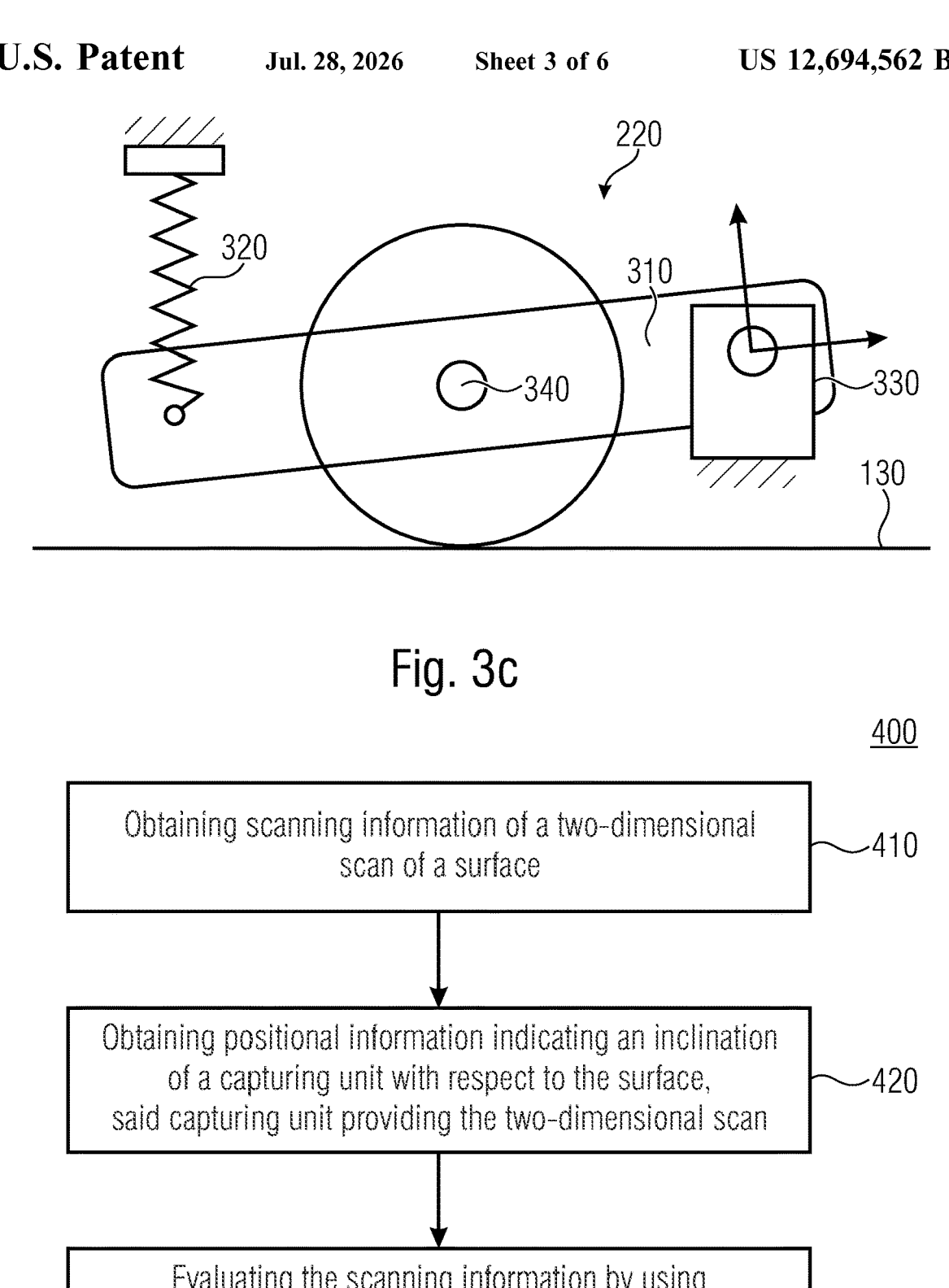

| Obtaining scanning information of a two-dimensional scan of a surface | 410 |

| Obtaining positional information indicating an inclination of a capturing unit with respect to the surface, said capturing unit providing the two-dimensional scan | 420 |

| Evaluating the scanning information by using the positional information with respect to a localization of the capturing unit relative to the surface | 430 |

Fig. 4

EVALUATION OF SCANNING INFORMATION USING POSITIONAL INFORMATION

CROSS-REFERENCES TO RELATED APPLICATIONS

This application is a continuation of copending International Application No. PCT/EP2021/082623, filed Nov. 23, 2021, which is incorporated herein by reference in its entirety, and additionally claims priority from German Application No. DE102020214974.7, filed Nov. 27, 2020, which is incorporated herein by reference in its entirety.

The present invention relates to an apparatus for evaluating scanning information using positional information. In particular, the invention relates to an optical inclination compensation by means of rotary encoders.

BACKGROUND OF THE INVENTION

Automatically travelling vehicles require a form of localization, e.g., to be able to safely travel through the space. This may involve cameras or other optical sensors that assist in relocating previously mapped features in the surrounding area through measurements, e.g. in the form of images. Since such measurements, or observations, are prone to error, they are usually recomputed with the help of a statistical estimator, such as a Kalman filter, with the odometry of the vehicle. This process may require a, e.g. optical, measurement of features whose only degree of freedom is the position of the vehicle. In case of vehicles with suspension, the distance of the vehicle to the ground may vary due to the deflection of the vehicle chassis. In addition, the entire vehicle may have an inclined position with respect to a fixed reference point in the world if the deflection at the different wheels has different magnitudes.

In operation, the deflection of the vehicle may change in different ways. The following may be reasons for this:

- change of the loading state, e.g. by accommodation or release of payloads with different weights,
- dynamic change of the acceleration vector, e.g. by strong deceleration or acceleration,
- material defect, e.g. a defective spring-damper element,
- unequal distribution of mass in the vehicle and/or a change of the distribution of mass in the vehicle, e.g. due to movement of a payload.

The deflection of the vehicle can change the position of the chassis and therefore also the position in the space of the sensors attached to the chassis, without a change of the position of the vehicle on the ground plane. Thus, it may be a degree of freedom that interferes with the localization. Here, it should be noted that the deflection does not necessarily have to be caused by conventional springs, but may also be due to a certain softness in the chassis, or underbody, e.g. due to pneumatic wheels.

Two cases can be considered for previous solutions. On the one hand, a rigid chassis can be used, which is not unusual in case of an indoor use of the vehicles. In this case, the above-described problem does not arise or it does almost not take arise. For example, there may be "incorrect measurements" only if the wheels of the vehicle lift off of the ground, e.g. in case of strong deceleration or acceleration operations. However, for example, this may occur for a short period of time only, which is why the incorrect measurement is of little or no significance. However, a technical disadvantage of a rigid chassis may be that bumps on the ground cannot be compensated for by the vehicle.

On the other hand, i.e. the case of chassis with suspension, algorithms that are robust against the perspective distortion of the sensor's positional change caused by the deflection may be used in the evaluation of the measurements of the sensor. A good example for this may be the localization via QR codes attached to the ground, as, among other things, used in the case of robots in warehouses. Such vehicles, or robots, may indeed be unsuspended, but QR codes are very robust against perspective distortions in their detection. Other landmark-based localization methods, e.g. which are based on codes in the surrounding area and not on the ground, may function identically or similarly.

However, in this case, marker-based approaches have the disadvantage that the markers, e.g. QR codes, have to be applied in the surrounding area in advance and information about the position, or the location, or the surrounding area of the marker have to be introduced into the marker. In turn, this may be associated with additional efforts regarding costs and time. In addition, replacement or maintenance, e.g. repainting, of the markers can be necessary, e.g. due to the wear of the markers, e.g. on grounds traveled by vehicles, or in case of dirt on the markers. This may also involve the disadvantage that the state of the marker needs to be monitored so as to avoid accidents or malfunctions.

Thus, there is a need for an improved concept that makes it possible to use vehicles that, on the one hand, have a suspension to ensure good travel characteristics, and, on the other hand, do not rely on markers applied in the surrounding area, i.e. that perform the navigation on their own, e.g. on the basis of optical scans, e.g. by extracting features of the surrounding area or through inherent features of the surrounding area.

Thus, it is the object of the present invention to provide an improved concept that makes it possible, using positional information, e.g. comprising information about a deflection of a vehicle with suspension, and scanning information of a capturing unit, e.g. which is part of the vehicle, to localize the capturing unit and therefore, e.g., the vehicle.

SUMMARY

An embodiment may have an apparatus, comprising: a processing unit configured to acquire scanning information of a two-dimensional scan of a surface; and acquire positional information indicating an inclination of a capturing unit with respect to the surface, said capturing unit providing the two-dimensional scan; perform a rectification of the scanning information for the scanning information using the positional information, and evaluate it with respect to a localization of the capturing unit relative to the surface; and determine distances and positions of features, information about which is comprised by the scanning information and which comprise information about the location of the capturing unit on the surface, so as to compare it to a database in order to determine the position of the capturing unit.

Another embodiment may have a method, comprising: acquiring scanning information of a two-dimensional scan of a surface; acquiring positional information indicating an inclination of a capturing unit with respect to the surface, said capturing unit providing the two-dimensional scan; evaluating the scanning information by using the positional information with respect to a localization of the capturing unit relative to the surface and performing a rectification of the scanning information on the basis of the positional information, and determining distances and positions of features, information about which is comprised by the scanning information and which comprise information about the location of the capturing unit on the surface, so as to compare it to a database in order to determine the position of the capturing unit.

Another embodiment may have a non-transitory digital storage medium having a computer program stored thereon to perform the method comprising: acquiring scanning information of a two-dimensional scan of a surface; acquiring positional information indicating an inclination of a capturing unit with respect to the surface, said capturing unit providing the two-dimensional scan; evaluating the scanning information by using the positional information with respect to a localization of the capturing unit relative to the surface and performing a rectification of the scanning information on the basis of the positional information, and determining distances and positions of features, information about which is comprised by the scanning information and which comprise information about the location of the capturing unit on the surface, so as to compare it to a database in order to determine the position of the capturing unit, when said computer program is run by a computer.

The inventors have realized that a localization of a capturing unit, e.g. which is part of a vehicle, may be improved and/or enabled on the basis of scanning information of two-dimensional scans of a surface from the capturing unit with positional information indicating an inclination of the capturing unit with respect to the surface. Embodiments according to the present invention are based on the core idea of using the positional information to evaluate the scanning information with respect to the localization of the capturing unit. The use of the positional information enables a simple pattern detection and/or a quick calculation of the position.

According to an embodiment, an apparatus includes a processing unit configured to obtain scanning information of a two-dimensional scan of a surface and to obtain positional information indicating an inclination of a capturing unit with respect to the surface, said capturing unit providing the two-dimensional scan, and to evaluate the scanning information by using the positional information with respect to a localization of the capturing unit relative to the surface.

Here, the capturing unit may be part of a vehicle that navigates across a surface. To localize the capturing unit and therefore, e.g., the vehicle, the processing unit of the apparatus may obtain scanning information of a two-dimensional scan of the surface from the capturing unit. In the case of a vehicle with suspension, the capturing unit may comprise an inclination with respect to the surface, e.g., due to different deflections of individual wheels of the vehicle. In the case of a drone, the capturing unit may comprise an inclination with respect to the surface, e.g., due to pitch and roll movements.

Here, e.g. on the basis of the scanning information only, i.e. in particular without additional use of markers, it may not be possible or it may be difficult to evaluate, with respect to the localization of the capturing unit, the scanning information that is distorted, e.g., due to the inclination of the capturing unit. Considering the inclination may have advantages particularly in localization methods that are based on a detection of inherent features of the surrounding area, e.g. features of the ground or the surrounding walls, instead of previously introduced markers. In such methods, e.g., features in the form of patterns are recognized in the surrounding area and are compared to a database. Due to distorted scanning information, a mapping to features stored in the database may fail and therefore the localization may fail. Thus, the processing unit is configured to obtain the positional information indicating the inclination of the capturing unit with respect to the surface. Thus, the inclination, e.g.

and therefore a distortion, may be considered so as to perform the localization of the capturing unit.

According to an embodiment, a method includes obtaining scanning information of a two-dimensional scan of a surface, obtaining positional information indicating an inclination of a capturing unit with respect to the surface, said capturing unit providing the two-dimensional scan, and evaluating the scanning information by using the positional information with respect to a localization of the capturing unit relative to the surface.

Through an inventive method, the scanning information of the surface may be evaluated, with respect to a localization of the capturing unit, taking into account the inclination of the capturing unit and taking into account the positional information, and/or an improved evaluation may carried out. Thus, an inventive method may therefore perform a localization on the basis of scanning information that do not comprise any encoded or other direct information about the inclination of the capturing unit.

According to an embodiment, a computer program includes program code for performing an inventive method. For example, a computer program for performing the inventive method may be performed on a vehicle, such as a mobile robot platform, to localize the vehicle, and/or in a central computing unit, e.g., obtaining scanning information from a multitude of vehicles and determining the positions of the vehicles on the basis thereof. In the form of a computer program, an inventive method may be employed in a multitude of applications and variations of applications, such as on microcontrollers or more performant computing means of central computing units.

According to an embodiment, the processing unit is configured to manipulate the scanning information by using the positional information to obtain manipulated scanning information and to perform an evaluation of the manipulated scanning information with respect to the localization of the capturing unit relative to the surface.

For example, a distortion of the scanning information due to an inclination of the capturing unit with respect to the surface may at least be partially compensated through the manipulation of the scanning information using the positional information. Through this, e.g., it may be possible that downstream evaluation methods, e.g. image evaluation methods, extract features from the scanning information that enable a localization of the capturing unit. Through this, the localization of the capturing unit may be performed in a more precise and/or more robust way.

According to an embodiment, the processing unit is configured to perform a rectification of the scanning information on the basis of the positional information. Geometric distortions in the scanning information, e.g. in the form of image data, may at least be partially equalized through a rectification, or equalization. Thus, scanning information, such as an image, may be converted in such a way as if it was captured perpendicularly to the surface. Through this, distances and positions of the features, information about which is contained in the scanning information and which contain information about the location of the capturing unit on the surface, may be determined so as to compare them to a database, for example, so as to determine the position of the capturing unit.

According to an embodiment, a capturing unit comprises a camera and/or a laser-distance sensor array. The use of a camera and/or a laser-distance sensor array is a cost-efficient, available, and usable possibility, in particular for mobile robot applications, to provide the scanning information. In addition, the information content of scanning information of this form of a capturing unit enables an extraction of features of the surrounding area for localizing the capturing unit.

According to an embodiment, the processing unit is configured to at least partially compensate a perspective distortion of the scanning information by using the positional information. The localization of the capturing unit may be enabled and/or improved through conditioning of the scanning information. For example, the evaluation of equalized scanning information enables the extraction of information about inherent features of the surrounding area whose comparison with a database enables inferring the position of the capturing unit. Furthermore, an improvement of distance estimations may be carried out, e.g. to avoid collisions with obstacles.

According to an embodiment, the apparatus includes a position capturing unit configured to capture the positional information, wherein the apparatus comprises the capturing unit. For example, the apparatus may be configured as a vehicle that comprises a capturing unit, e.g. a camera, for navigating on the surface. For taking into account the positional information and/or for manipulating the scanning information so as to localize the capturing unit and therefore also the apparatus, the apparatus additionally comprises a position capturing unit so as to capture the positional information. For example, the position capturing unit may be configured as a multi-axis rotation angle sensor, e.g., arranged in proximity to the capturing unit so as to capture the positional information.

The combination of the apparatus with position capturing unit and capturing unit may be used for an automatically or autonomously travelling robot. Through the combination of a sensor system in the position capturing unit and the capturing unit and an evaluation in the form of the processing unit of the apparatus, a system that may independently find its way in an environment, e.g. with the help of a determination of its own position, may be provided. Through the improvement of the localization by using the positional information of the position capturing unit, a corresponding vehicle may orientate itself or may at least orientate itself better in an unknown environment, e.g. which does not have any markers.

According to an embodiment, the apparatus is a vehicle with at least two wheel segments with suspension, and the capturing unit comprises a predetermined relative position with respect to the at least two wheel segments with suspension. Through the configuration of the apparatus as a vehicle with at least two wheel segments with suspension, good travelling characteristics of the apparatus may be achieved, for example, so that it may also be used in difficult terrain with uneven grounds. In this case, in particular, the apparatus may comprise three, four, or more wheel segments with suspension. Through the predetermined position of the capturing unit with respect to the at least two wheel segments with suspension, a determination of the deflection of the wheel segment may allow computing the inclination of the capturing unit, e.g. so as to improve the scanning information and/or its evaluation.

According to an embodiment, the position capturing unit comprises at least two sensor elements, wherein the at least two sensor elements are each arranged at one of the at least two wheel segments with suspension, and wherein the processing unit is configured to receive, from each of the at least two sensor elements, measurement values that are correlated with a suspension travel of the wheel segment, and to calculate the positional information on the basis of a combination of the measurement values.

By arranging the sensor elements each directly at the wheel segments with suspension, e.g., simple and/or cost-efficient sensor elements may be employed. Instead of a central sensor, e.g. that comprises several measurement axes (i.e. which may perform measurements in several spatial dimensions, for example), several, e.g. simple or single-axis, sensors (e.g. which may perform measurements with respect to one spatial dimension only) whose measurement information is combined may be used. In addition, more than one sensor element may be arranged at one wheel segment with suspension each, e.g. to provide redundancy in particularly safety-critical applications.

According to an embodiment, the at least two sensor elements are arranged at the wheel segment such that, in case of a downward or upward deflection of the wheel segments, a major positional change of the sensor element occurs. Through such an arrangement of the sensor element as the wheel segments, the sensitivity of the positional information with respect to a change of inclination of the capturing unit may be improved so that even small changes of the downward or upward deflection of the wheel segments already affect the measurement values of the sensor elements. Thus, in turn, the precision of the localization of the capturing unit may be improved.

According to an embodiment, the processing unit is configured to receive measurement values from each of the at least two sensor elements, and to determine information about the suspension travel of the at least two wheel segments on the basis of the measurement values, wherein the information about the suspension travel include information about a distance of the respective wheel segment to the surface, said distance being variable through the suspension of the wheel segments, and therefore information about the inclination of the capturing unit with respect to the surface.

For example, through stored geometry information of the wheel segments and the relative position of the capturing unit with respect to the wheel segment, the capturing unit may determine the deflection of the respective wheel segment through an evaluation of the measurement values, and therefore the distance of the wheel segments, which is variable through the suspension, with respect to the surface. The distance of the wheel segments to the surface may in turn be used for computing the inclination of the capturing unit with respect to the surface through the predetermined relative position of the capturing unit.

According to an embodiment, the at least two sensor elements comprise distance sensors and/or rotary encoders. Distance sensors and rotary encoders form robust and available sensor elements that may be used, e.g., in particular in vehicles such as mobile robot platforms. Due to the good availability of such sensors, a corresponding apparatus may also be produced in large quantities. Furthermore, the use of distance sensors enables a direct determination of the distance of the wheel segment with respect to the surface for determining the positional information of the capturing unit. Through rotary encoders, the deflection, or the distance of the wheel segments to the surface, may be inferred through the determination of an inclination of the wheel segments together with known geometry information of the wheel segments, so as to, in turn, determine therefrom the positional information, e.g. information about the inclination of the capturing unit with respect to the surface.

In this case, for example, distance sensors may comprise ultrasound sensors and/or laser distance measurements, or laser-distance sensors. In principle, these may be used, such as with rotary encoders, to determine the tilted position of a vehicle and therefore the inclination of the capturing unit, for example.

According to an embodiment, the apparatus is a vehicle for a sorting system. The configuration of the apparatus as a vehicle, e.g. with a capturing unit and a position capturing unit, may enable realizing an autonomously or automatically travelling robot. Such an inventive apparatus may have major advantages with respect to the use in a sorting system, e.g. due to the improved localization by taking into account the positional information, so that it is possible to plan trajectories and avoid collisions through an improved determination of positions of the individual robots, e.g. in particular without the elaborate and costly use of markers.

According to an embodiment, the vehicle is configured to travel autonomously. Through the inventive improved determination of positions, autonomous travel may be enabled and/or improved since the danger of collisions may be decreased, e.g. due to more precise information about the vehicle's own position.

According to an embodiment, the method further includes manipulating the scanning information by using the positional information so as to obtain manipulated scanning information, and evaluating the manipulated scanning information with respect to the localization of the capturing unit relative to the surface.

The manipulation of the scanning information by using the positional information may enable the extraction of features of the surrounding area from the scanning information, and/or the evaluation of the features, e.g. which may be inherent features of the surrounding area such as patterns in a ground surface, with respect to the shape (or type) of the features and/or, e.g. in particular the relative positions of the features with respect to each other. By improving the scanning information through the positional information, a determination of absolute distances may be possible, i.e. distances that are not distorted by an inclination of the capturing unit, which may in turn be used for a determination of positions by means of a reference, e.g. through a comparison to a database.

BRIEF DESCRIPTION OF THE DRAWINGS

Embodiments of the present invention will be detailed subsequently referring to the appended drawings, in which:

FIG. 3$b$ shows a schematic side view of the wheel segment with suspension of FIG. 3$a$ in an exemplary downwardly-deflected state according to an embodiment of the present invention;

FIG. 3$c$ shows a schematic side view of the wheel segment with suspension of FIG. 3$a$ in an exemplary upwardly-deflected state according to an embodiment of the present invention;

FIG. 4 shows a flow diagram of a method according to an embodiment of the present invention;

FIG. 5$b$ shows a schematic side view of the other wheel segment with suspension of FIG. 5$a$ and an exemplary downwardly-deflected state according to an embodiment of the present invention;

FIG. 5$c$ shows a schematic side view of the other wheel segment with suspension of FIG. 5$a$ in an exemplary upwardly-deflected state according to an embodiment of the present invention;

DETAILED DESCRIPTION OF THE INVENTION

Figure 1:
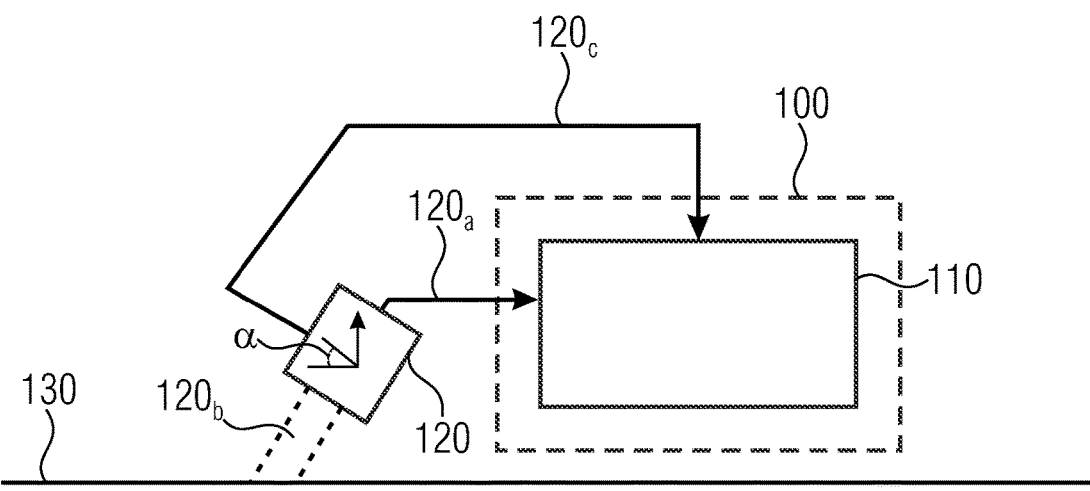
FIG. 1 shows a schematic side view of an apparatus according to an embodiment of the present invention.

Before embodiments of the present invention are subsequently described in more detail on the basis of the drawings, it is to be noted that identical or functionally identical elements, objects, and/or structures, or elements, objects, and/or structures with the same effect are provided in the different drawings with the same or similar reference numerals so that the description of these elements illustrated in different embodiments is interchangeable or applicable to each other.

FIG. 1 shows a schematic side view of an apparatus according to an embodiment of the present invention. FIG. 1 shows an apparatus 100 with a processing unit 110 configured to obtain scanning information 120$_a$ of a two-dimensional scan 120$_b$ of a surface 130 and to further obtain positional information 120$_c$ (e.g. angle information a) indicating an inclination (e.g. angle $\alpha$) of a capturing unit 120 with respect to the surface 130, said capturing unit providing the two-dimensional scan 120$_b$. The positional information can indicate the inclination with respect to the surface under which the scanning information 120$_a$ was obtained at the time of the scan 120$_b$. For example, the positional information 120$_c$ can indicate which position or inclination a capturing unit 120 optionally being part of the apparatus 100 comprises at this point in time. In addition, the processing unit 110 is configured to evaluate the scanning information 120$_a$ by using the positional information 120$_c$ with respect to a localization of the capturing unit 120 relative to the surface 130.

In this case, e.g., the capturing unit 120 may be part of a drone or a part of a mobile robot that navigates across a ground surface 130. The capturing unit 120 may comprise a camera and/or a laser-distance sensor array. Furthermore, the capturing unit may be an area scan camera or a line scan camera, but may also be equipped for a different, advantageously optical, scan of the surface, such as by means of RADAR (Radio Detecting and Ranging) or LiDAR (Light Detecting and Ranging).

An inclination of the capturing unit 120 may occur due to a movement and/or an acceleration of the capturing unit 120, e.g. due to a deflection of a vehicle comprising the capturing unit 120, e.g. when traveling through a curve or when increasing or decreasing the speed relative to the surface 130. For example, this can prevent the scan 120$_b$ of the surface 130 from taking place orthogonally or perpendicularly to the surface 130 so that the scanning information 120$_a$ comprises a perspective distortion due to the inclination. By providing the positional information 120$_c$, e.g. information about the angle $\alpha$, such a perspective distortion may be taken into account or may be at least partially compensated in the evaluation of the scanning information $120_a$.

This may enable an improved determination of features of the surrounding area, e.g. by determining distances and positions of inherent features of the surrounding area that may be contained in the scanning information $120_a$ through a correction of the distortion by means of the positional information $120_c$. Through such a form of a classification of the surrounding area, e.g. mapping, the localization of the capturing unit 120 may be carried out, e.g., on the basis of a priori information, through detection of features or feature clusters, such as the arrangement of a multitude of features in a certain pattern with certain distances with respect to each other. Through a compensation of the inclination using the positional information, features that are a little or not robust at all against perspective distortions, e.g. as QR codes are known for, may be used to determine the position. Through this, a multitude of features may be used, which makes the localization be flexible.

Figure 2:
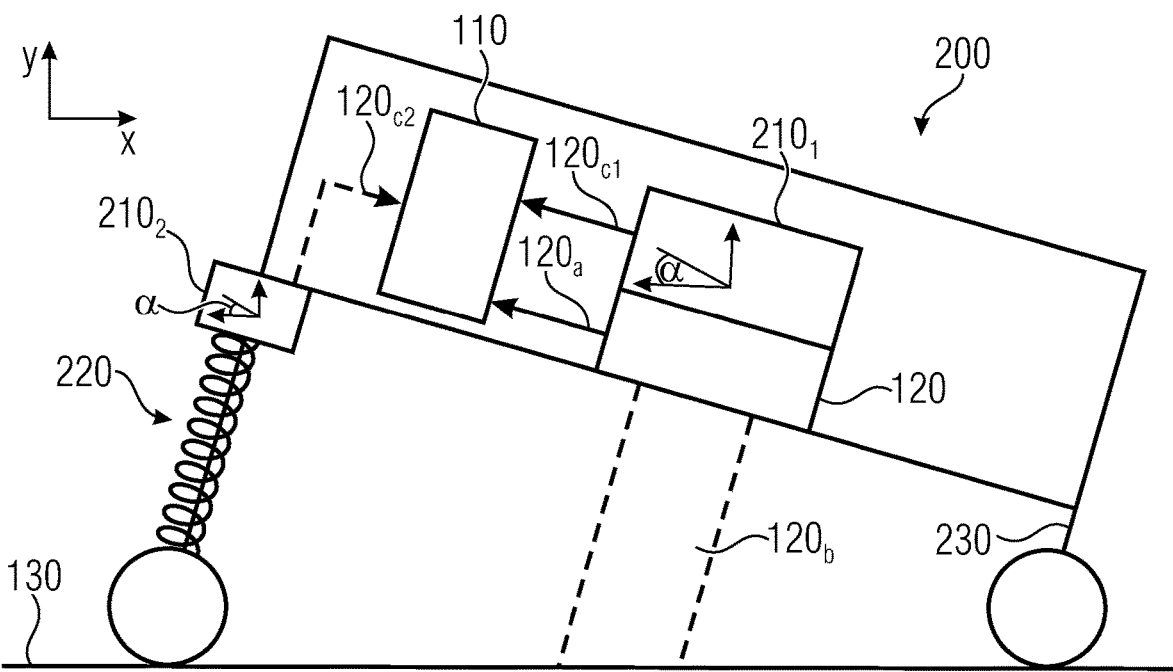
FIG. 2 shows a schematic side view of an apparatus according to an embodiment of the present invention, wherein the apparatus is configured as a vehicle and comprises the capturing unit and the position capturing unit.

FIG. 2 shows a schematic side view of an apparatus according to an embodiment of the present invention, wherein the apparatus is configured as a vehicle and comprises the capturing unit and the position capturing unit. FIG. 2 shows an apparatus 200 configured as a vehicle, e.g., as a mobile robot platform, with a processing unit 110, a capturing unit 120, and a position capturing unit 210. The vehicle 200 comprises wheel segments 220 with suspension. As is shown in FIG. 2, not all of the wheel segments have to have a suspension, the vehicle 200 also comprises wheel segments 230 without suspension. Here, it is to be noted that only one of the wheel segments 220 with suspension is illustrated in the side view. In addition, all wheel segments may have a suspension. Furthermore, the wheel segments with suspension do not necessarily have to be located at one end of the vehicle 200, the illustration with the wheel segments with suspension at the one side of the vehicle only serves as an example. Here, the wheel segments 220 with suspension are illustrated in an outwardly-deflected state, e.g. due to an acceleration of the apparatus 200, e.g. in the x-direction (orientated towards the negative x-direction). FIG. 2 shows a configuration of the position capturing unit 210 with an optional central sensor element $210_1$. Alternatively or additionally, the position capturing unit 210 may comprise sensor elements $210_2$ each arranged at the wheel segments 220 with suspension. In this case, for example, the sensor elements may include gyroscopes (angular rate sensors), ultrasound sensors, laser-distance sensors or sensor arrays, and incremental encoders.

In this case, the processing unit 110 is configured to obtain scanning information $120_a$ of a two-dimensional scan $120_b$ of a surface 130 and to obtain positional information $120_c$, i.e. the positional information $120_c$, from the central sensor $210_1$ and/or the positional information $120_{c2}$ from the sensor elements $210_2$, indicating an inclination (e.g. a) of the capturing unit 120 with respect to the surface 130, said capturing unit providing the scan $120_b$. In this case, the processing unit 110 may also be configured to obtain positional information $120_c$ comprising at least two measurement values of the sensor elements 210, wherein the two measurement values comprise at least part of information about the inclination of the capturing unit 120.

For a vehicle 200 that has only two wheel segments 220 with suspension, e.g. a front axle with suspension with two wheel segments 220 and a rear axle without suspension with at least one wheel segment 230, the at least two measurement values may be provided by at least two sensor elements $210_1$ each arranged at a wheel segment 220 with suspension (e.g. at least one measurement value per sensor element $210_1$). In this case, due to the evaluation of the at least two measurement values and, e.g., a known distance of the at least one wheel segments 230 without suspension to the surface 130, e.g. said distance being constant due to the lack of a suspension, positional information of the vehicle 200 and therefore also of the capturing unit 120 may be provided.

In case of a vehicle 200 that has at least three wheel segments 220 with suspension, e.g. a wheel segment 220 with suspension at the front axle and two wheel segments 220 with suspension at the rear axle, or two wheel segments 220 with suspension at the front and the rear axle each, the processing unit 110 may be configured to obtain positional information $120_c$ comprising at least three measurement values, wherein the three measurement values comprise at least parts of information about the inclination of the capturing unit 120. The at least three measurement values may be provided by at least three sensor elements $210_1$ each arranged at one of the wheel segments 220 with suspension (e.g. at least one measurement value per sensor element $210_1$). In turn, information about an inclination of the vehicle 200 and therefore the capturing 120 may be determined with the at least three measurement values.

In both cases, alternatively or additionally, the at least two or at least three measurement values may be provided by a central sensor element $210_2$ that may capture the measurement values with respect to several measurement axes, i.e. with respect to different spatial directions.

Thus, the processing unit 110 may manipulate the scanning information $120_a$ using the positional information $120_c$ so as to obtain manipulated scanning information and to use them with respect to a localization of the capturing unit 120 and in this case also of the vehicle 200.

In this case, the manipulation may include a compensation or at least a partial compensation of a perspective distortion of the scanning information $120_a$. For example, the scanning information $120_a$ may be distorted by the inclination (e.g. angle α) of the capturing unit 120 with respect to the surface 130, which in turn may be compensated by the processing unit 110 using the positional information $120_c$. In other words, the scanning information $120_a$ may be equalized, for example. To this end, e.g., a rectification of the scanning information $120_a$ may be carried out by means of the processing unit 110.

According to FIG. 2, the capturing unit 120 comprises a predetermined relative position with respect to the at least two wheel segments 220 with suspension. Through this, e.g. when using the sensor elements $210_2$, an inclination of the capturing unit 120 may be computed by means of an evaluation of the positional information $120_{c2}$, taking into account the geometric distances and angles between the sensor elements $210_2$ and the capturing unit 120.

In this case, the sensor elements $210_2$ may generate measurement values that are correlated with a suspension travel of the wheel segments 220 so that the positional information $120_{c2}$ about the wheel segments 220 comprises, due to the predetermined relative position of the capturing unit 120 with respect to the at least two wheel segments 220 with suspension, positional information $120_c$ about the inclination of the capturing unit 120 with respect to the surface 130. In this case, the arrangement of sensor elements $210_2$ may be selected such that, in case of a downward deflection or an upward deflection of the wheel segments 220, a major positional change of the sensor elements $210_2$ takes place, e.g., so as to also be able to detect and therefore compensate small inclinations and positional changes of the capturing unit 120. With respect to the oscillation (or vibration), the sensor elements may therefore be arranged at locations with a large amplitude.

Figure 3A:
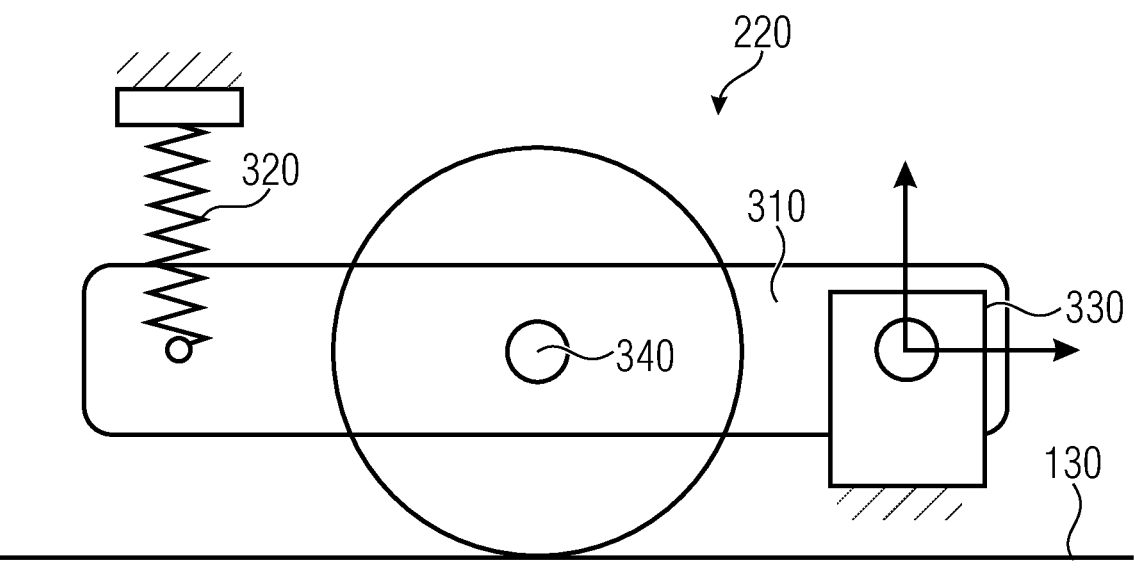
FIG. 3$a$ shows a schematic side view of a wheel segment with suspension in a neutral position according to an embodiment of the present invention.
Figure 3B:
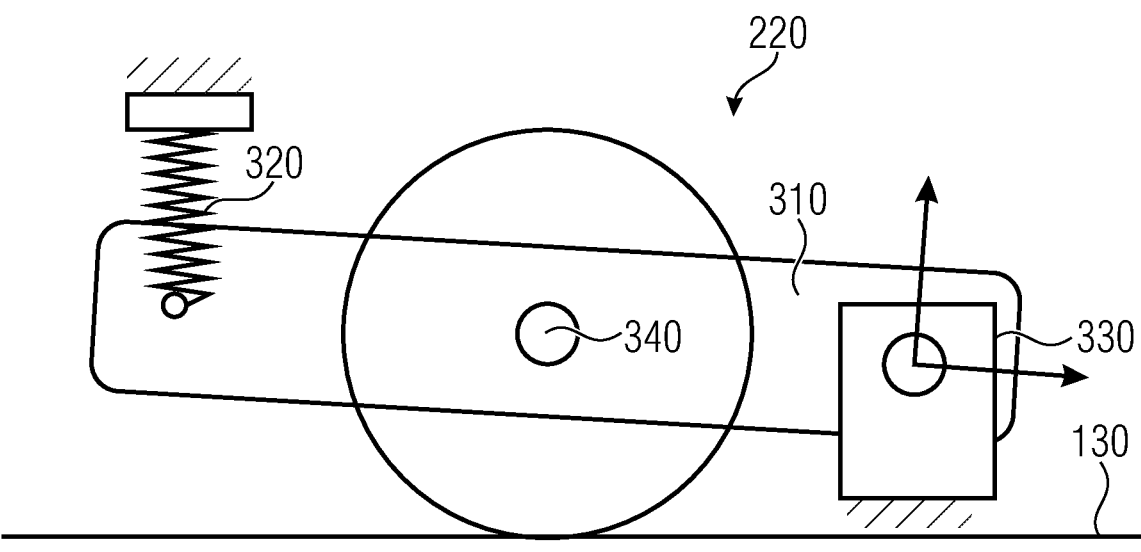

In the following, examples for inventive states of the wheel segments with suspension will be described in more detail on the basis of FIGS. 3a, 3b, and 3c. FIGS. 3a, 3b and 3c may illustrate a detailed view of the previously-explained, e.g. on the basis of FIG. 2, wheel segments 220 with suspension together with the sensor elements in FIG. 3 in the form of rotary encoders in different states, in embodiments. FIG. 3a shows a schematic side view of a wheel segment with suspension in a neutral position, 3b shows a schematic side view of the wheel segment with suspension of FIG. 3a in an exemplary downwardly-deflected state, and FIG. 3c shows a schematic side view of the wheel segment with suspension of FIG. 3a in an exemplary upwardly-deflected state.

FIGS. 3a-c show wheel segments 220 with suspension comprising wheel swing arms 310, suspensions 320, and rotatory encoders 330. Furthermore, the wheel segments 220 comprise pivot points 340 forming a rotational axis of the wheel swing arms 310 with respect to the deflection of the suspensions 320. For example, through the predetermined relative position of the capturing unit 120 with respect to the wheel segments 220, the rotary encoders 330 may indicate at least parts of information about the position of the capturing unit, e.g. a camera, with respect to the surface 130. For example, each of the rotary encoders 330 may indicate a local inclination or rotation. For example, using at least two (e.g. together with geometrically-caused known information such as a distance of a wheel segment 230 without suspension to the surface 130) or at least three spaced-apart rotary encoders 330 or other sensor elements 210, such partial information may be used to determine an inclination at another location, e.g. of the capturing unit 120, taking into account the geometric arrangement or position, e.g. by taking into account that a plane that is subject to the inclination may be determined via three points in the space.

In other words, it is possible to determine the inclination locally at the location of the capturing unit 120, e.g. by using a single sensor element 210. When positioning several distributed sensor elements 210, they may be evaluated mutually by taking into account the distribution geometry.

FIG. 3a shows a starting position of the vehicle comprising the wheel segment 220, wherein the spring of the suspension 320 is in a neutral position so that an image compensation, e.g. due to a downward deflection or upward deflection, does not have to be required. FIG. 3b shows a state of the vehicle in which the spring of the suspension 320 is downwardly-deflected, e.g., so that the illustrated area of the vehicle is lower than other areas, and the rotary encoder 330 captures inclination information that deviates from the reference position of FIG. 3a. The capturing unit, e.g. a camera, may be located closer to the ground 130 than in FIG. 3a (cf. e.g. FIG. 5b), e.g. when being arranged away from the pivot point 340 at a corner of the vehicle, or the wheel segment 220, or the wheel swing arm 310 of the vehicle.

FIG. 3c shows a state of the vehicle in which the spring of the suspension 320 is upwardly-deflected, e.g., so that the area of the vehicle is higher than other areas, and the rotary encoder 330 captures other different inclination information. In this regard, reference is made to the examples of FIG. 2. In this case, the capturing unit may be located further spaced apart from the ground (cf. e.g. FIG. 5c), e.g. when being arranged away from the pivot point at a corner of the vehicle, or the wheel segment 220, or the wheel swing arm 310 of the vehicle.

It is intended that FIGS. 3a-c show the fundamental idea of embodiments according to the invention, which is to obtain, e.g. precise, information about the, e.g. precise, deflection of each wheel of the vehicle. To this end, embodiments provide the rotary encoders 330 attached at the swing arms 310 of the wheel segments and/or the wheel suspension.

The suspension travel may be determined via the angle at the pivot point 340. The position of the vehicle in space may be determined, e.g. precisely, through a combination of the measurements of the different wheels, or in other words the measurement values of the different rotatory encoders 330 of the wheel segments 220 with suspension. In embodiments, it may be advantageous to provide at least three measurement points so as to be able to unambiguously determine the positon of a plane in the space and therefore, e.g., the position of the capturing unit and thus of the vehicle. Images may be transformed such that they seem to have been captured from another position in the space via an image processing method known as rectification. With this technique, the measurement values of the capturing unit, e.g. in the form of an optic sensor, may be equalized, i.e. at the end, e.g. after the equalization, or rectification, they appear as if they were captured in a non-deflected state.

While some embodiments provide for a use of the rectification, which generally refers to images, inventive apparatuses, and methods are not limited to the exclusive use of images. In the context of inventive concepts, other forms of scanning information may be manipulated, i.e. equalized, using the positional information. Accordingly, an inventive method may also equalize scanning information or measurements from a laser-distance sensor array, for example. In one-dimensional scans, or in other words in one-dimensional cases, a measurement or scan may be interpreted as an image line.

Furthermore, it is to be noted that the tilted position of the vehicle or the inclination of the capturing unit may be determined via different types of distance sensors, such as ultrasound sensors or laser-distance measurements or laser-distance sensors, e.g., instead of the rotary encoders 330 shown in FIGS. 3a-c.

In addition, the suspension may also be determined by measurement directly at/in the spring/damper unit, e.g., of a wheel segment 220. However, in this case, a determination of the suspension travel with a sensor element $210_2$ at a wheel swing arm 310 of a wheel segment 220 may have the advantage that it can be implemented with less effort and with fewer costs. Furthermore, a measurement of the angle, e.g. the rotation angle of the wheel swing arms 310 of the wheel segments 220, by means of the rotary encoders 330 may be possible with less errors and/or tolerances.

FIG. 4 shows a flow diagram of a method according to an embodiment of the present invention. The method 400 includes a step 410 of obtaining scanning information of a two-dimensional scan of a surface, a step 420 of obtaining positional information indicating an inclination of a capturing unit with respect to the surface, said capturing unit providing the two-dimensional scan, and a further step 430 of evaluating the scanning information by using the positional information with respect to a localization of the capturing unit relative to the surface. It is to be noted that the steps 410 and 420 may be carried out in any sequence and/or simultaneously, since both steps provide input quantities for step 430, possibly independently of each other.

Optionally, the method 400 may include manipulating the scanning information by using the positional information so as to obtain manipulated scanning information. For taking into account the manipulated scanning information, step 430 may comprise evaluating the manipulated scanning information with respect to the localization of the capturing unit relative to the surface.

Figure 5A:
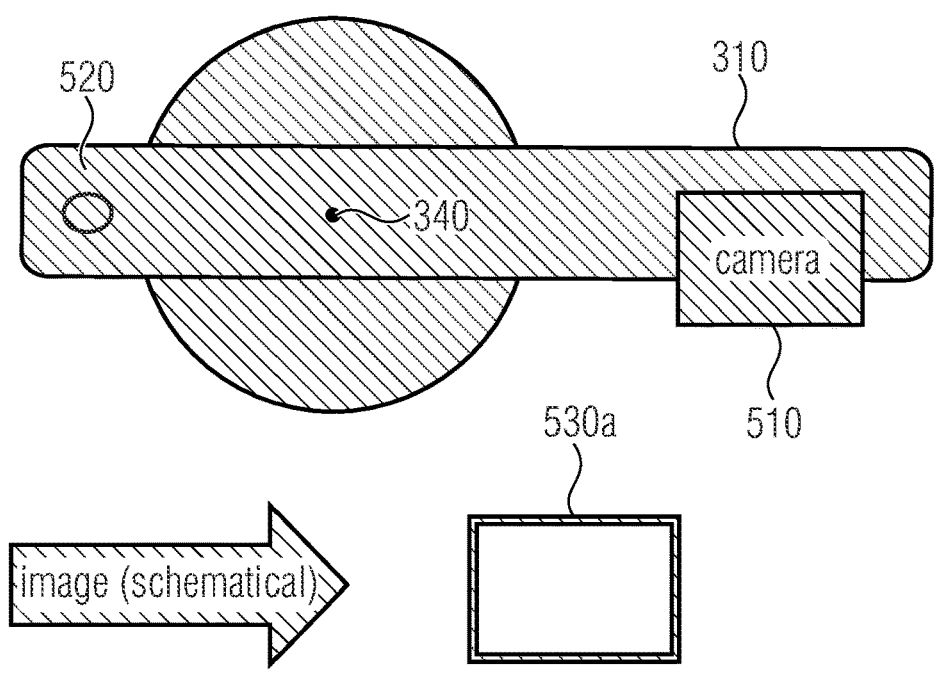
FIG. 5$a$ shows a schematic side view of another wheel segment with suspension in a neutral position according to an embodiment of the present invention.
Figure 5B:
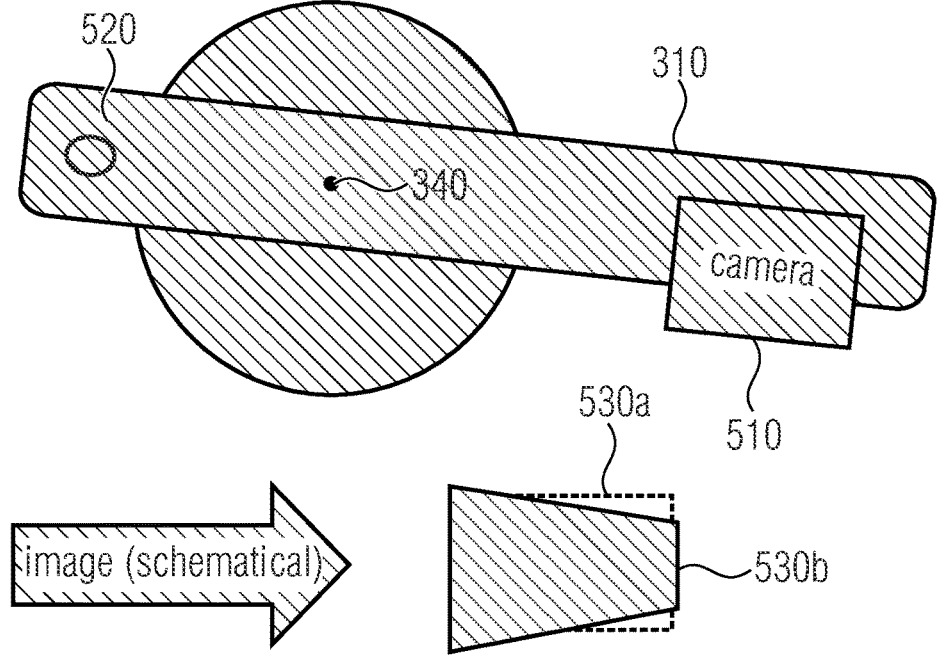
Figure 5C:
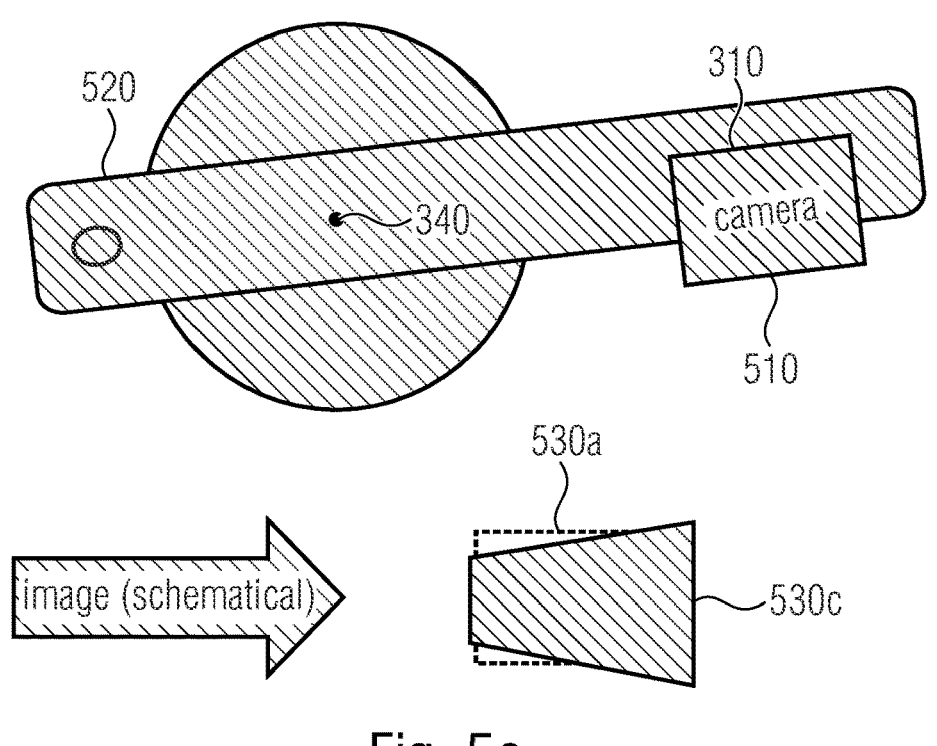

The position of the capturing unit in case of a change of the suspension state of wheel segments with suspension will be described in more detail on the basis of FIGS. 5*a-c*. FIGS. 5*a-c* show wheel segments with suspension comprising wheel swing arms 310, as well as a capturing unit configured as a camera 510. In FIGS. 5*a-c*, the camera 510 is fixedly connected to a housing and therefore in turn to the wheel swing 310, for example, as is the case in reality or in many practical implementations. That is, the camera 510 may not be pivotally supported so that in case of an inclination of the swing arm 310 it is no longer orientated perpendicularly to the ground surface, or, due to a changed suspension state, it comprises a variable orientation or inclination to the ground.

The wheel segments further comprise pivot points 340 that form a rotational axis of the wheel swing arms 310 with respect to the deflection of the suspensions. In contrast to FIGS. 3*a-c*, to simplify the explanation, the suspension is not explicitly illustrated, with the exception of the attack point 520 of the suspension at the wheel spring 310. Here, FIGS. 5*a-c* may also form a simplified illustration of FIGS. 3*a-c*, wherein the capturing unit is additionally shown in the form of a camera 510. To simplify the explanation, a rotary encoder similar to FIGS. 3*a-c* is not explicitly shown; however, it may be present according to the disclosure. Furthermore, FIGS. 5*a-c* show schematic images 530*a-c* based on a scan of the capturing unit, i.e. the camera 510, as a function of the respective state of the suspension of the wheel segment.

FIG. 5*a* shows a schematic side view of a wheel segment with suspension in a neutral position, analogously to FIG. 3*a*. In the case of a planar ground surface, the camera 510 is located in parallel to the surface so that an undistorted image 530*a* can be captured.

FIG. 5*b* shows a schematic side view of the wheel segment with suspension of FIG. 5*a* in an exemplary downwardly-deflected state, analogously to FIG. 3*b*. Through the downwardly-deflected state, the camera 510 is closer to the ground surface and comprises an inclination angle with respect to the ground surface. For example, when observing a single swing arm 310, e.g., a maximum number of two degrees of freedom may change, i.e. the distance to the ground if the camera 510 is not fixed at the center of the axis or the pivot point 340, and the angle of the camera 510, e.g. the observation angle of the camera 510 with respect to the ground surface. In case of a construction width several swing arms 310, e.g. that is a multi-axis vehicle with suspension, and a fixation at the housing, e.g. when fixing the camera 510 at a housing which is in turn fixedly connected to the wheel swing arm 310, a maximum number of three degrees of freedom may change, i.e. roll and pitch angles of the camera 510 as well as the distance to the ground surface, e.g. the ground. Simply put, e.g. specifically with respect to FIG. 5*b* or the image 530*b*, if the wheel swing 310 is tilted, the camera 510 is also orientated obliquely to the ground or captures the same obliquely. Accordingly, compared to the image 530*a*, the image 530*b* is distorted, e.g. a trapezoid image 530*b* is created from the rectangular image 530*a*.

FIG. 5*c* shows a schematic side view of the wheel segment with suspension of FIG. 5*a* in an exemplary upwardly-deflected state, analogously to FIG. 3*c*. Due to the upwardly-deflected state, the camera 510 is located further away from the ground surface and comprises an inclination angle with respect to the ground surface. Accordingly, compared to the image 530*a*, the image 530*c* is also distorted.

Figure 6:
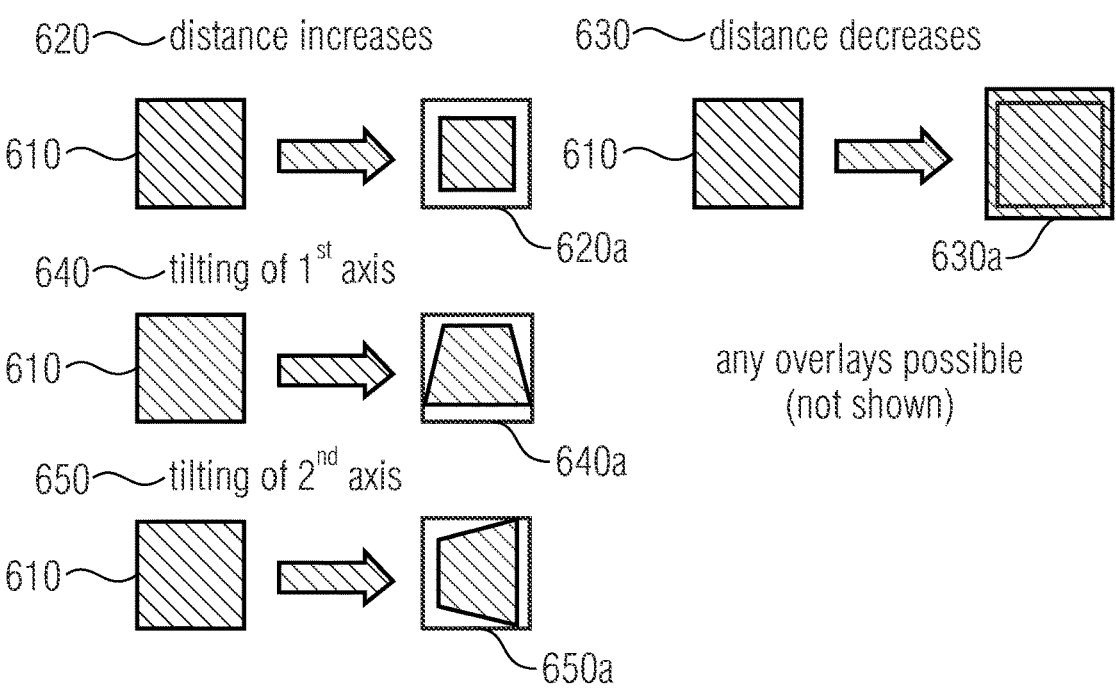
FIG. 6 shows schematic illustrations of possible perspective distortions of the scanning information which are being addressed with embodiments of the present invention.

Possible distortions of the scanning information, e.g. of the images 530*a-c*, will be explained in more detail on the basis of FIG. 6. Even though the effects are illustrated individually, they may also occur in combination, which is not in contrast to the embodiments described herein. FIG. 6 shows reference scanning information 610, e.g., captured by a camera 510 fixed to the wheel swing arm in a neutral position, e.g., analogously to FIG. 5*a*.

An increase 620 of the distance of the capturing image to the surface may lead to a miniaturization of an image section of the reference scanning information 610, i.e. the actually captured object area is only a part of the full image. This is illustrated with the result scanning information 620*a*.

A decrease 630 of the distance of the capturing image to the surface may lead to an enlargement of an image section of the reference scanning information 610, i.e. only parts of the reference scanning information 610 are captured, for example. This is illustrated with the result scanning information 630*a*.

In this case, a tilting 640 of the capturing unit with respect to a first axis may lead to a distortion of an image section of the reference scanning information 610 with respect to the first axis. This is illustrated with the result scanning information 640*a*. A tilting 650 of the capturing unit may further occur with respect to a second axis that is possibly perpendicular to the first axis. Thus, e.g., one of the axes may be at least partially determined through the pivot point 340 that may be understood as an axis on the basis of a rotational axis in the three-dimensional body of the two-dimensional side sectional views shown. The result of a tilting about the second axis is exemplarily illustrated with the result scanning information 650*a*.

The modified scanning information 620*a*, 630*a*, 640*a*, and/or 650*a* may be corrected individually or in combination with embodiments described herein taking into account the positional information, wherein the evaluation of the scanning information described herein by using the exemplary rectification may include an equalization and/or scaling.

For example, in this case, the tilting with respect to a first and/or second axis may result from the previously-described roll and/or pitch angle of a camera with respect to a ground surface. For example, this type of tilting and also the changes of distance may occur during acceleration or deceleration and/or in case of turns of a vehicle with suspension. Furthermore, it is to be noted that any overlays of the distortions and/or enlargements and/or miniaturizations of the scanning information are possible, e.g., in particular with respect to vehicles with a multitude of wheel segments with suspension. In addition, the positioning of the camera 510 at the wheel swing arm 310 is to be considered only as an example to describe the inventive concepts. In case of a vehicle with several wheel segments with suspension, the camera may also be located in the center of the vehicle and does not have to be attached to one of the individual wheel swing arms 310. Through the deflection of the individual wheel segments, an overlay of the described distortions in the form of changes of distance and/or tilting may arise for the camera 510, or for an image captured by the camera, e.g. due to the connection between the individual wheel swing arms and the chassis of the vehicle at which the camera may be attached.

FIG. 6 shows that an evaluation of the scanning information according to the disclosure by using positional information, e.g. a rectification of an image captured by a camera 510 through the angle information of rotary encoders, may have significant advantages in order to compensate for undesired distortions, for example. In order to ensure good driving characteristics, the use of vehicles with suspension may be indispensable; however, this may amplify the problem of distorted scanning information due to the extended driving dynamics. Due to the distortion of the scanning information, a localization, e.g. on the basis of features of the surrounding area, may be difficult or even impossible since, due to the distortion, the features may not be detected, which is why inventive concepts with the use of positional information, e.g. for correcting an image, may provide great advantages.

Figure 7:
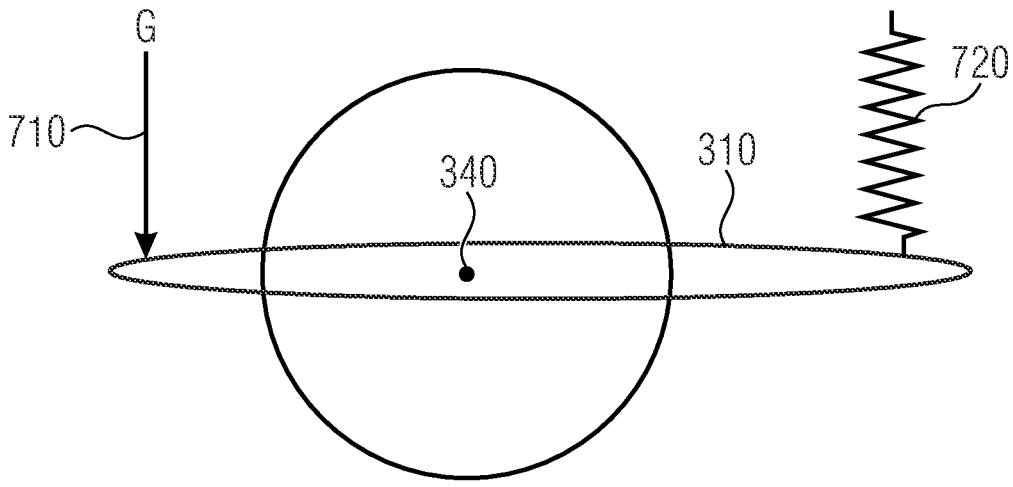
FIG. 7 shows a schematic side view of a wheel segment with suspension with a wheel swing arm with counter-suspension according to an embodiment of the present invention.

FIG. 7 shows a schematic side view of a wheel segment with suspension with a wheel swing arm with counter-suspension according to an embodiment of the present invention. The wheel swing arm 310 has a pivot point 340 and is counter-suspended with respect to a load 710 with the weight G via a counter-suspension 720. In embodiments, according to FIG. 3*a-c*, a rotary encoder may be arranged with respect to the pivot point 340 on the side of the counter-suspension 720, i.e. on the right side in the image. In case of a strain on the swing arm 310 via a load 710, the suspension state of the counter-suspension 720 may change, which may lead to an inclination of the swing arm 310. Such an inclination may be detected by a rotary encoder.

In such a case, e.g., the chassis of a vehicle may form the load, wherein said chassis, e.g., comprise the capturing unit and is loaded or unloaded, for example. Even if a vehicle is symmetrically loaded such that all wheel segments with suspension of the vehicle are upwardly-deflected and downwardly-deflected in the same way, according to the invention, inclination information may be captured by the rotary encoder at the wheel swing arms, due to the inclination of the wheel swing arm 310, due to the load 710, and the counter-suspension 720. For example, through a combinative evaluation of the inclination information of the rotary encoders, e.g. of the angle of the wheel swing arms 310 with respect to the pivot points 340, an inclination of the capturing unit may be computed.

For example, if all rotary encoders of different wheel segments have the same inclination angle of the wheel swing arms 310, a parallel orientation of the capturing unit with respect to the ground surface may be inferred. At the same time, a suspension travel of the individual wheel segments may be calculated through the inclination of the individual rotary encoders and, e.g., known geometry parameters of the wheel segments so that a change of distance of the capturing unit with respect to the ground surface (e.g. according to FIG. 6, image 620*a*/630*a*) may be inferred. With this, in turn, a manipulation, such as a scaling, of the scanning information may be performed.

Again, it is to be noted that any combinations of changes of distance and tiling or distortions may be detected, or compensated, in such a way. In addition, it is to be noted that FIG. 7 illustrates only an example for configurations of wheel segments according to the invention, and that the load 710 and the counter-suspension 720 may be interchanged, analogously to positioning the rotary encoders on the one or the other side of the pivot point 340 on the swing arm 310.

CONCLUSIONS AND FURTHER REMARKS

In general, embodiments of the present invention provide a possibility to compensate perspective distortions. Through this, scanning information of the capturing unit, e.g. measurement data of an optical sensor, may be used for methods such as localization methods that are not robust against this type of distortion, in contrast to QR codes, for example. This may be interesting or advantageous in particular for image sensors, however, apparatuses and methods according to the invention are not limited to the use of image sensors. For example, in particular, inventive concepts may simplify the use of optical sensors for the localization, e.g., in application cases in which a strong deflection is to be expected. Alternatively or additionally, inventive concepts may increase the accuracy, or the accuracy to be expected, of the localization of the capturing unit or the vehicle, for example.

Embodiments according to the present invention are based on the determination of a position of a vehicle in the space on the basis of a deflection, e.g., by using rotary encoders at the wheel swing arm of wheel segments, e.g. wheel suspensions.

Technical application fields of embodiments according to the present invention may be the localization of automatic or autonomous vehicles or robots via optical sensors.

In embodiments according to the present invention, the processing unit may be implemented by means of any appropriate circuit structures, such as microprocessor circuits, ASIC circuits, CMOS circuits, and the like. In examples, the processing unit may be implemented as a combination of hardware structures and machine-readable commands. For example, the processing unit may comprise a processor or a memory device storing machine-readable commands that provide the functionalities described herein and lead to the execution of methods described herein if they are carried out by the processor. In examples, the storage device may be implemented by any appropriate storage devices, such as ROM, PROM, EPROM, EEPROM, Flash memories, FRAM (ferroelectric RAM), MRAM (magneto-resistive RAM), or phase-change RAM.

All lists of materials, environmental influences, electrical properties, and optical properties listed herein are to be considered as being examples and are not exhaustive.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer, or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier that comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the computer-readable medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device, or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus, comprising: a processing unit configured to acquire scanning information of a two-dimensional scan of a surface; and acquire positional information indicating an inclination of a capturing unit with respect to the surface, said capturing unit providing the two-dimensional scan;

perform a rectification of the scanning information for the scanning information using the positional information, and evaluate it with respect to a localization of the capturing unit relative to the surface; and determine distances and positions of features, information about which is comprised by the scanning information and which comprise information about the location of the capturing unit on the surface, so as to compare it to a database in order to determine the position of the capturing unit;

wherein the apparatus is configured as a vehicle, and further comprising one of the following:

1) wherein the vehicle comprises the capturing unit that comprises at least one of a camera, a laser-distance sensor array, an area scan camera, a line scan camera, and a unit configured for scanning the surface by means of RADAR (Radio Detecting and Ranging) or LiDAR (Light Detecting and Ranging), and wherein the capturing unit is fixedly connected to a housing of the vehicle and is arranged in a predetermined relative position with respect to the housing, so that an orientation or inclination of the capturing unit to the surface depends on a deflection of wheel segments of the vehicle, and wherein the vehicle comprises a position capturing unit configured to capture the positional information, wherein the position capturing unit comprises a central sensor element formed as a gyroscope, or wherein the position capturing unit comprises at least two spaced-apart sensor elements and is configured, using geometrically-caused known information and taking into account a geometric arrangement or position, to determine an inclination of the capturing unit, or wherein the position capturing unit comprises at least three spaced-apart sensor elements and is configured, taking into account a geometric arrangement or position, to determine an inclination of the capturing unit, wherein the sensor elements comprise a distance sensor for determining a distance to the surface and/or a rotary encoder for indicating a local inclination or rotation; or 2). wherein the vehicle comprises a position capturing unit configured to capture the positional information and wherein the vehicle comprises the capturing unit, and wherein the vehicle comprises at least two wheel segments with suspension and wherein the capturing unit comprises a predetermined relative position with respect to the at least two wheel segments with suspension, and wherein the position capturing unit comprises at least two sensor elements, wherein the at least two sensor elements are each arranged at one of the at least two wheel segments with suspension, and wherein the processing unit is configured to receive, from each of the at least two sensor elements, measurement values that are correlated with a suspension travel of the wheel segments, and to calculate the positional information on the basis of a combination of the measurement values, and wherein the at least two sensor elements are arranged at locations of the wheel segments in dependence on an amplitude of an oscillation of a downward deflection and of an upward deflection of the respective wheel segment, so that the at least two sensor elements are sensitive with respect to the suspension travel of the wheel segments.

2. Apparatus according to claim 1, wherein the scanning information is based on an optical scan of the surface by means of the capturing unit.

3. Apparatus according to claim 1, wherein the processing unit is configured to acquire equalized scanning information through the rectification, and to perform an evaluation of the equalized scanning information for a pattern detection to extract information about inherent features of the surface, and to infer the position of the capturing unit through its comparison to a database.

4. Apparatus according to claim 1, wherein the processing unit is configured to, using a manipulation of the scanning information acquired through the rectification, perform an extraction of features of the surface from the scanning information, and/or to perform the evaluation of the features with respect to a shape of the features and/or the relative position of the features with respect to each other.

5. Apparatus according to claim 1, wherein the processing unit is configured to manipulate the scanning information using the positional information so as to acquire manipulated scanning information; and perform an evaluation of the manipulated scanning information with respect to the localization of the capturing unit relative to the surface.

6. Apparatus according to claim 1, wherein the processing unit is configured to at least partially compensate a perspective distortion of the scanning information using the positional information.

7. Apparatus according to claim 1, wherein the processing unit is configured to:

receive measurement values from each of the at least two sensor elements; and determine information about the suspension travel of the at least two wheel segments on the basis of the measurement values, wherein the information about the suspension travel comprises information about a distance of the respective wheel segment to the surface, said distance being variable through the suspension of the wheel segments, and therefore information about the inclination of the capturing unit with respect to the surface.

8. Apparatus according to claim 7, wherein the at least two sensor elements comprise rotary encoders.

9. Apparatus according to claim 1, wherein the apparatus is a vehicle of a sorting system.

10. Apparatus according to claim 9, wherein the vehicle of the sorting system is configured to travel autonomously.

11. Method of determining a position of a capturing unit of a vehicle, comprising: acquiring scanning information of a two-dimensional scan of a surface;

acquiring positional information, using a position capturing unit, the positional information indicating an inclination of a capturing unit with respect to the surface, said capturing unit providing the two-dimensional scan;

evaluating the scanning information by using the positional information with respect to a localization of the capturing unit relative to the surface and performing a rectification of the scanning information on the basis of the positional information, and determining distances and positions of features, information about which is comprised by the scanning information and which comprise information about the location of the capturing unit on the surface, so as to compare it to a database in order to determine the position of the capturing unit; wherein the vehicle further comprises one of the following:

1). wherein the capturing unit is part of the vehicle, and wherein the capturing unit comprises at least one of a camera, a laser-distance sensor array, an area scan camera, a line scan camera, and a unit configured for scanning the surface by means of RADAR (Radio Detecting and Ranging) or LiDAR (Light Detecting and Ranging), and wherein the capturing unit is fixedly connected to a housing of the vehicle and is arranged in a predetermined relative position with respect to the housing, so that an orientation or inclination of the capturing unit to the surface depends on a deflection of wheel segments of the vehicle, and wherein the position capturing unit is part of the vehicle, and wherein the position capturing unit comprises a central sensor element formed as a gyroscope, or wherein the position capturing unit comprises at least two spaced-apart sensor elements and is configured, using geometrically-caused known information and taking into account a geometric arrangement or position, to determine an inclination of the capturing unit, or wherein the position capturing unit comprises at least three spaced-apart sensor elements and is configured, taking into account a geometric arrangement or position, to determine an inclination of the capturing unit, wherein the sensor elements comprise a distance sensor for determining a distance to the surface and/or a rotary encoder for indicating a local inclination or rotation; or 2). wherein the position capturing unit is part of the vehicle, and wherein the vehicle comprises at least two wheel segments with suspension and wherein the capturing unit comprises a predetermined relative position with respect to the at least two wheel segments with suspension, and wherein the position capturing unit comprises at least two sensor elements, wherein the at least two sensor elements are each arranged at one of the at least two wheel segments with suspension, and wherein the method further comprises receiving, from each of the at least two sensor elements, measurement values that are correlated with a suspension travel of the wheel segments, and calculating the positional information on the basis of a combination of the measurement values, and wherein the at least two sensor elements are arranged at locations of the wheel segments in dependence on an amplitude of an oscillation of a downward deflection and of an upward deflection of the respective wheel segment, so that the at least two sensor elements are sensitive with respect to the suspension travel of the wheel segments.

12. Method according to claim 11, wherein the method further comprises:

manipulating the scanning information by using the positional information so as to acquire manipulated scanning information; and evaluating the manipulated scanning information with respect to the localization of the capturing unit relative to the surface.

13. Non-transitory digital storage medium having a computer program stored thereon to perform a method of determining a position of a capturing unit of a vehicle, the method comprising: acquiring scanning information of a two-dimensional scan of a surface;

acquiring positional information, using a position capturing unit, the positional information indicating an inclination of a capturing unit with respect to the surface, said capturing unit providing the two-dimensional scan;

evaluating the scanning information by using the positional information with respect to a localization of the capturing unit relative to the surface and performing a rectification of the scanning information on the basis of the positional information, and determining distances and positions of features, information about which is comprised by the scanning information and which comprise information about the location of the capturing unit on the surface, so as to compare it to a database in order to determine the position of the capturing unit;

wherein the vehicle further comprises one of the following:

1). wherein the capturing unit is part of a vehicle, and wherein the capturing unit comprises at least one of a camera, a laser-distance sensor array, an area scan camera, a line scan camera, and a unit configured for scanning the surface by means of RADAR (Radio Detecting and Ranging) or LiDAR (Light Detecting and Ranging), and wherein the capturing unit is fixedly connected to a housing of the vehicle and is arranged in a predetermined relative position with respect to the housing, so that an orientation or inclination of the capturing unit to the surface depends on a deflection of wheel segments of the vehicle, and wherein the position capturing unit is part of the vehicle, and wherein the position capturing unit comprises a central sensor element formed as a gyroscope, or wherein the position capturing unit comprises at least two spaced-apart sensor elements and is configured, using geometrically-caused known information and taking into account a geometric arrangement or position, to determine an inclination of the capturing unit, or wherein the position capturing unit comprises at least three spaced-apart sensor elements and is configured, taking into account a geometric arrangement or position, to determine an inclination of the capturing unit, wherein the sensor elements comprise a distance sensor for determining a distance to the surface and/or a rotary encoder for indicating a local inclination or rotation; or 2). wherein the position capturing unit is part of the vehicle, and wherein the vehicle comprises at least two wheel segments with suspension and wherein the capturing unit comprises a predetermined relative position with respect to the at least two wheel segments with suspension, and wherein the position capturing unit comprises at least two sensor elements, wherein the at least two sensor elements are each arranged at one of the at least two wheel segments with suspension, and wherein the method further comprises receiving, from each of the at least two sensor elements, measurement values that are correlated with a suspension travel of the wheel segments, and calculating the positional information on the basis of a combination of the measurement values, and wherein the at least two sensor elements are arranged at locations of the wheel segments in dependence on an amplitude of an oscillation of a downward deflection and of an upward deflection of the respective wheel segment, so that the at least two sensor elements are sensitive with respect to the suspension travel of the wheel segments;

when said computer program is run by a computer.

* * * * *